United States Patent [19]
Loesel

[11] Patent Number: 5,400,956
[45] Date of Patent: Mar. 28, 1995

[54] JUICE DISPENSER WITH STRAINER

[76] Inventor: Leigh K. Loesel, 430 Indiana Dr., Erie, Pa. 16505

[21] Appl. No.: 219,907

[22] Filed: Mar. 30, 1994

[51] Int. Cl.[6] .................... B65D 5/40; B01D 24/38
[52] U.S. Cl. ........................ 229/125.42; 210/464; 210/467; 222/189
[58] Field of Search .................. 229/214–219, 229/125.04, 125.09, 125.42; 222/189; 210/464, 466, 467, 468, 469

[56] References Cited

U.S. PATENT DOCUMENTS

| | | | |
|---|---|---|---|
| 693,732 | 2/1902 | Morgan | 210/464 |
| 1,731,698 | 10/1929 | Anderson | 210/467 |
| 2,321,856 | 6/1943 | Read | 222/189 |
| 2,516,471 | 7/1950 | Letsch | 222/189 |
| 2,646,200 | 7/1953 | Atkins | 229/125.04 |
| 2,721,688 | 10/1955 | Beymer | 229/125.09 |
| 2,753,051 | 7/1956 | Tupper | 222/189 |
| 2,777,611 | 1/1957 | Kamin | 222/189 |
| 2,885,084 | 5/1959 | Rocca | 229/125.09 |
| 2,927,695 | 3/1960 | Bartolomeo | 229/125.09 |
| 3,016,168 | 1/1962 | Larson | 222/189 |
| 3,018,024 | 1/1962 | Foord | 229/125.09 |
| 4,049,157 | 9/1977 | Carson | 222/189 |
| 5,152,438 | 10/1992 | Gordon et al. | 229/125.04 |
| 5,178,761 | 1/1993 | Mohun | 210/464 |

Primary Examiner—Gary E. Elkins
Attorney, Agent, or Firm—Richard K. Thomson

[57] ABSTRACT

An improved container for high pulp juice. The container includes a strainer for optionally filtering the juice so that the pulp is retained within the container for those who prefer low pulp juice.

8 Claims, 3 Drawing Sheets

JUICE DISPENSER WITH STRAINER

BACKGROUND AND SUMMARY OF THE INVENTION

This invention is directed to citrus juice containers. More particularly this invention is directed to an improved orange juice carton for high pulp juice which is equipped with a pulp strainer which may optionally be deployed for those preferring low pulp juice.

Citrus juice, particularly orange juice, is being offered in a high-pulp version. While this is attactive to some consumers, there may be members of their households who prefer low-pulp juice. Prior to the present invention, consumers had to keep two varieties of juice dispensers in their refrigerators and keep straight which was which.

The present invention proposes incorporating a straining means into the juice carton so that it may be optionally deployed by those preferring low-pulp juice thereby simultaneously increasing the percentage pulp in the juice remaining in the carton for the benefit of the high-pulp juice lovers.

Various features, characteristics and advantages of the present invention will become apparent after a reading of the following specification.

DETAILED DESCRIPTION OF THE PREFERRED EMBODIMENTS

Figure 1:
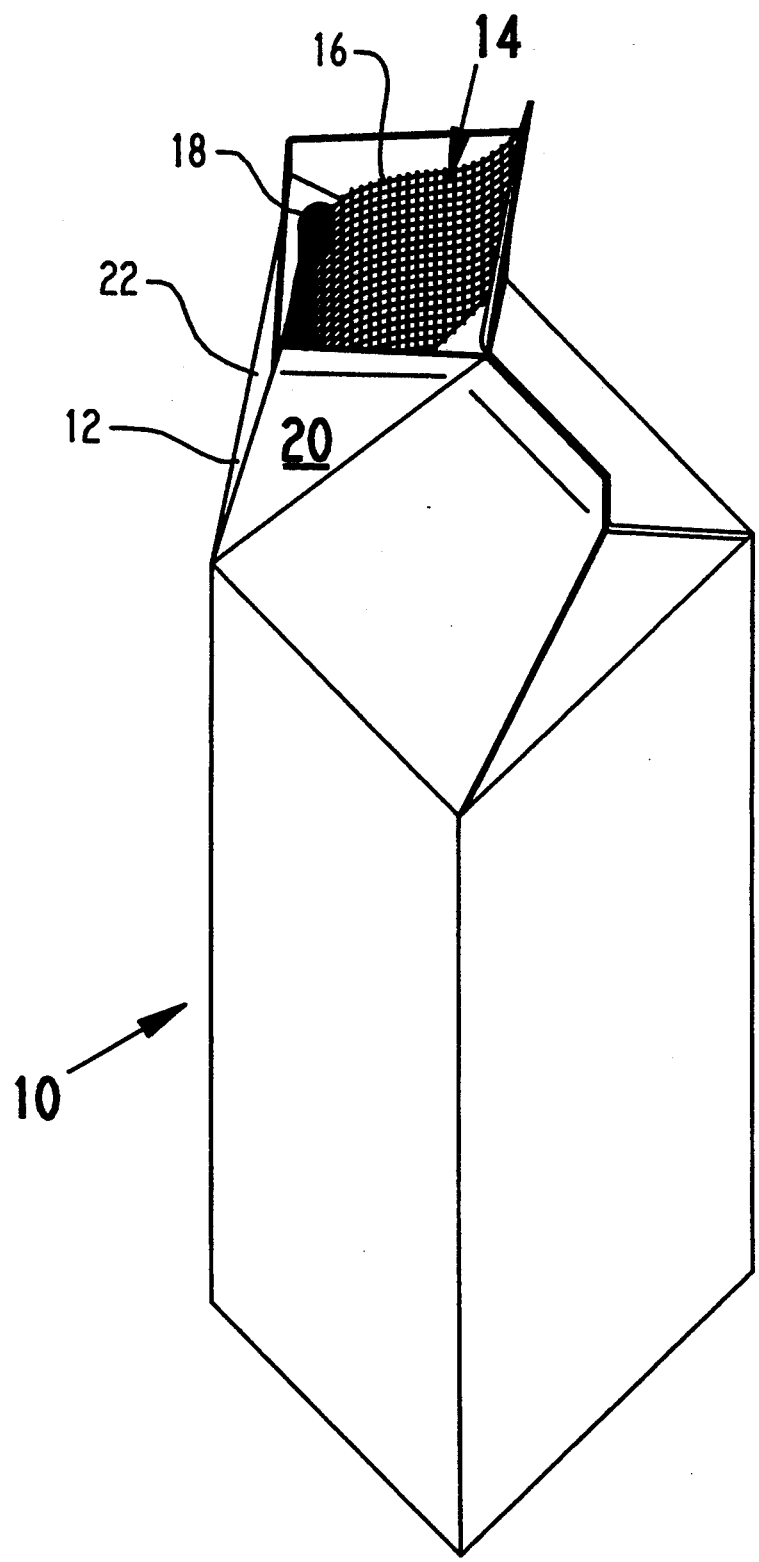
FIG. 1 is a perspective view of the juice container of the present invention.
Figure 4:
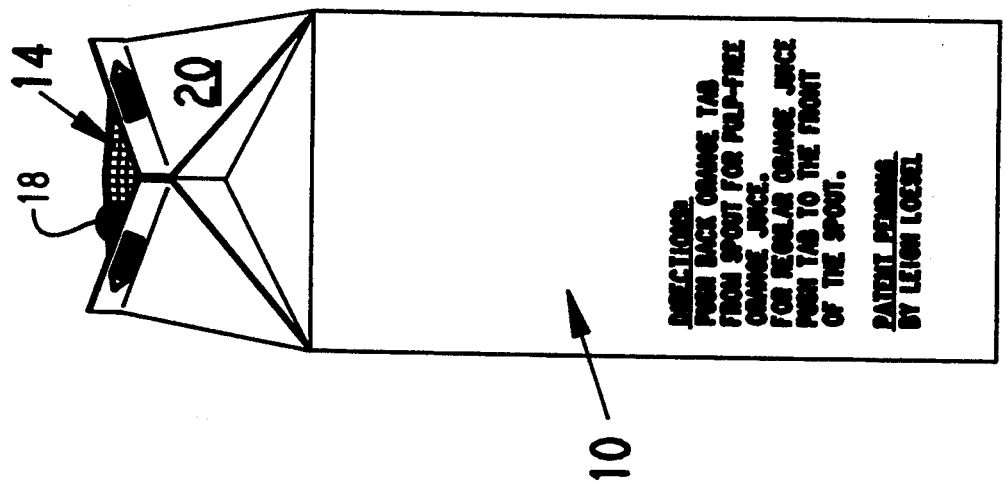
FIG. 4 is a rear view of the container of the present invention.
Figure 3:
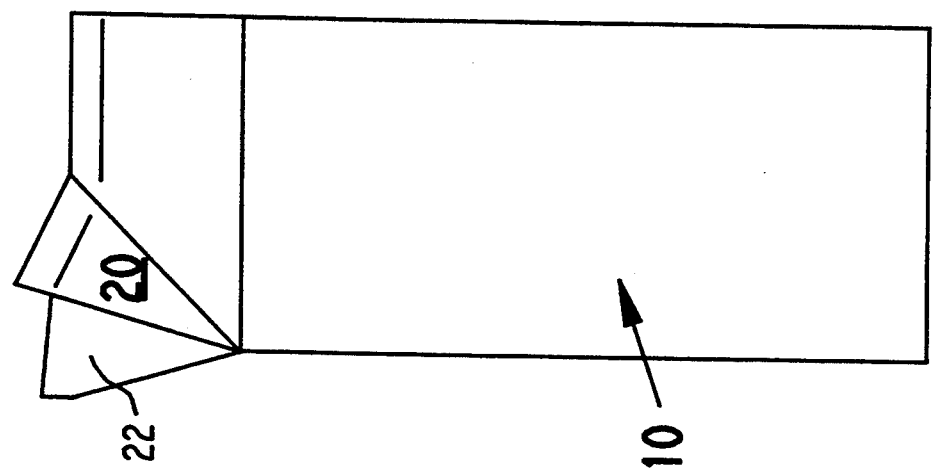
FIG. 3 is a side view of the container of the present invention.
Figure 2:
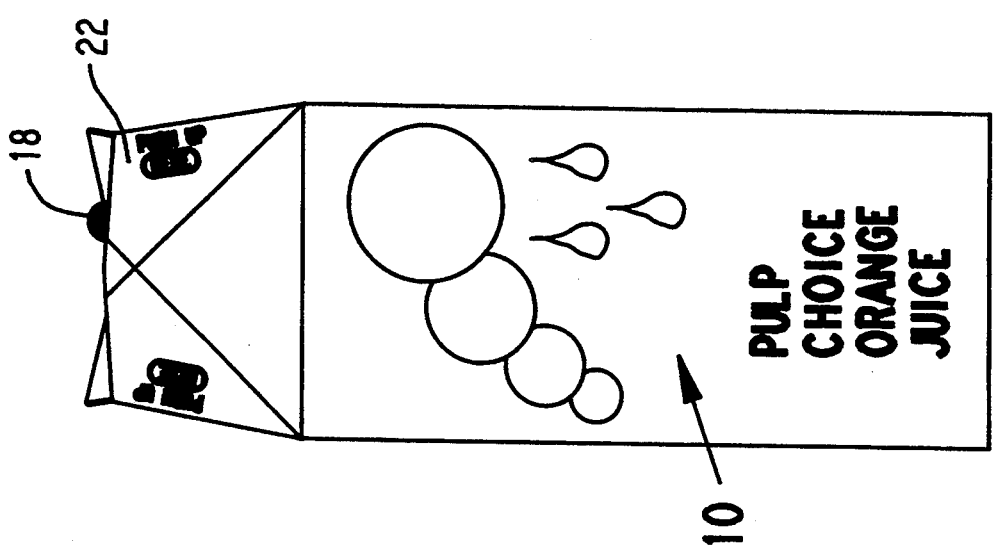
FIG. 2 is a front view of the container of the present invention.
Figure 5:
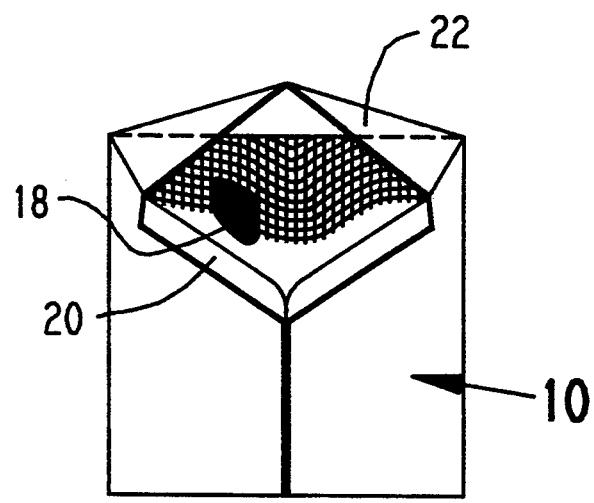
FIG. 5 is a top view of the container of the present invention.

The improved juice container/dispenser of the present invention is shown in FIGS. 1-5 generally at 10. Container 10 is equipped with a conventional diamond-shaped pour spout 12. Just inside spout 12 is a straining means 14 which, in its deployed position, can retain the pulp of the high-pulp juice within container 10. Preferably, straining means 14 comprises a portion of screen material which may be made of a non-toxic, hypo-allergenic plastic or nylon-like material. Upper edge 16 of screen 14 has secured thereto a tab 18. Tab 18 may alternatively be folded over a rear portion 20 of spout 12 to retain the screen in a deployed, operative postion or over a front portion 22 of spout 12 to retain screen 14 in a non-deployed, inoperative position. Tab 18 is but one means of retaining straining means 14 in its operative position during pouring. Tab 18 may of course, be folded down within container 10 so as not to interfere with the folding and sealing operation.

Figure 6:
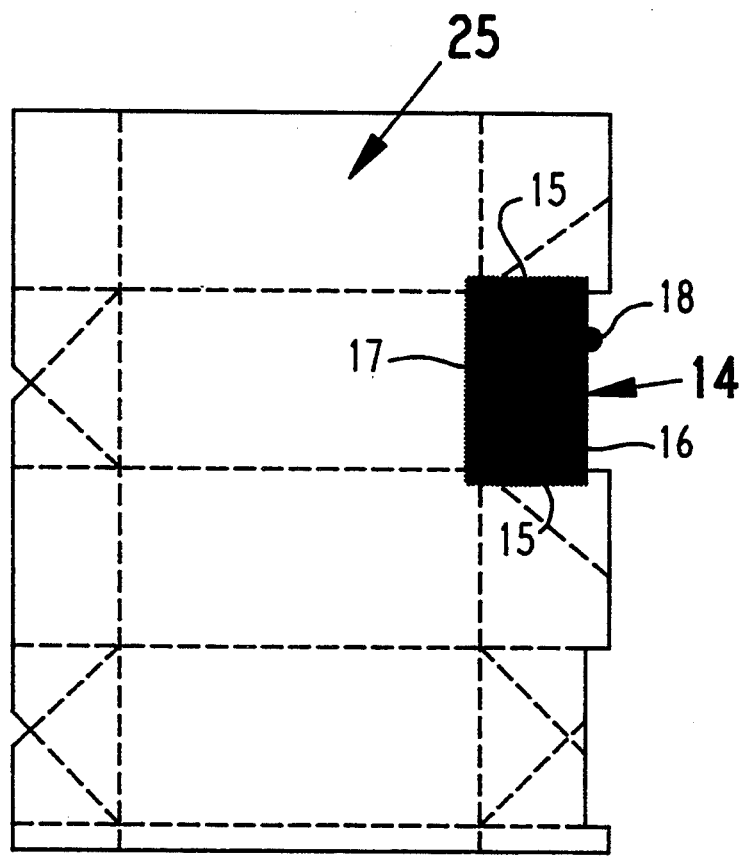
FIG. 6 is a top view of the blank used in making the container.

FIG. 6 depicts an open carton blank 25. Screen material of strainer 14 is preferably secured to spout 12 about lateral edges 15 as well as along bottom edge 17 as by an adhesive, or the like. While this shows a preferred way of retaining the straining means 14 in place, it will be appreciated that other methods may be employed without departing from the spirit or scope of the invention. Various changes, alternatives and modifications will become apparent following a reading of the foregoing specification. It is intended that all such changes, alternatives, and modifications as fall within the scope of the appended claims be considered part of the present invention.

What I claim is:

1. An improved citrus juice container for dispensing liquid high pulp juice comprising:
   a) a carton having a pour spout which defines an opening;
   b) a staining means positioned within said pour spout, said straining means having a first inoperative position adjacent said pour spout permitting said liquid high pulp juice to flow over a lateral surface of said straining means and from said container through said pour spout and a second operative position overlying said opening, said straining means in said operative position removing pulp from said liquid juice which is being poured from said container and retaining it in the liquid juice remaining within the container for subsequent dispensing.

2. The improved container of claim 1 wherein said straining means comprises a portion of screen material.

3. The improved container of claim 2 wherein said screen material is a non-toxic, hypoallergenic plastic material.

4. The improved container of claim 2 wherein said screen material is of generally rectangular configuration and is affixed to said carton along three edges thereof.

5. The improved container of claim 4 wherein said screen material is affixed to said carton by an adhesive.

6. The improved container of claim 1 wherein said straining means further comprises a securement means for retaining said straining means in said operative position.

7. The improved container of claim 6 wherein said securement means comprises a tab secured to said straining means which may be folded over a rear portion of said spout so said straining means remains in said operative position during pouring when desired.

8. The improved container of claim 7 wherein said tab may alternatively be folded over a front portion of said spout so said straining means remains in said inoperative position during pouring when desired.

* * * * *